United States Patent [19]

Ehrenhaft

[11] 4,229,648

[45] * Oct. 21, 1980

[54] ADDITIVE COLOR SYSTEM WITH COMPENSATION OF REPEATABILITY ERRORS OF VARIABLE-DENSITY ELECTROOPTICAL FILTER UNITS

[75] Inventor: Franz F. Ehrenhaft, Forest Hills, N.Y.

[73] Assignee: Anamorphic Ltd., Forest Hills, N.Y.

[*] Notice: The portion of the term of this patent subsequent to Jun. 13, 1995, has been disclaimed.

[21] Appl. No.: 920,375

[22] Filed: Jun. 21, 1978

Related U.S. Application Data

[63] Continuation of Ser. No. 769,838, Feb. 17, 1977, Pat. No. 4,095,099.

[51] Int. Cl.³ .............................................. G01J 1/32
[52] U.S. Cl. .................................... 250/205; 350/150
[58] Field of Search .............. 250/205, 209, 226, 225; 356/320, 326, 327; 350/150, 345, 356, 357

[56] References Cited

U.S. PATENT DOCUMENTS

| 3,675,022 | 7/1972  | Nelson et al. | 350/150 |
| 3,705,758 | 12/1972 | Haskal        | 350/150 |
| 3,986,022 | 10/1976 | Hyatt         | 250/205 |
| 4,091,279 | 5/1978  | Kaufman       | 350/150 |

Primary Examiner—David C. Nelms
Attorney, Agent, or Firm—Michael J. Striker

[57] ABSTRACT

The additive color system includes a light source providing three component light beams. The component beams are combined to form a composite beam. Three variable-density electrooptical filter units are provided, each arranged in the path of a respective one of the component beams. Each filter unit attenuates the respective component beam in dependence upon a control voltage applied to its control electrodes. A selecting device selects the transmission value to which the filter units are to be set. A circuit generates corresponding control voltages and applies them to the control electrodes of the filter units, and includes compensating circuits for compensating for repeatability errors in the response of the filter units.

5 Claims, 7 Drawing Figures

ADDITIVE COLOR SYSTEM WITH COMPENSATION OF REPEATABILITY ERRORS OF VARIABLE-DENSITY ELECTROOPTICAL FILTER UNITS

This is a continuation, of application Ser. No. 769,838, filed Feb. 17, 1978 now U.S. Pat. No. 4,095,099.

BACKGROUND OF THE INVENTION

The invention relates to additive color systems of the type operative for independently attenuating three component beams of light and then combining the component beams to form a composite beam of white light having a corrected color balance.

Such systems are typically used when duplicating color transparencies by printing. Conventionally, each transparency is analyzed and a determination is made of what corrections are required for the red, green and blue components of the white exposure light used for the actual printing. However, such systems are also used in a wide variety of other applications, wherever it is necessary to be able to independently select the color components of a beam of light.

Conventionally, the attenuation of the component light beams is performed using adjustable diaphragms, electromechanical light valves or sets of neutral filters of different density.

However, particularly when the additive color system is used to supply color-corrected white light to a high-speed printer, the time required to change the density of mechanical or electromechanical attenuators will often be so great as to prevent the fullest utilization of the high-speed capability of the printer.

As a result, I have considered the possibility of using for the controllable attenuators recently developed controllable-density electrooptical filter units. Examples of such filter units include ferroelectric-ceramic, liquid crystal and suspended-dipole filter units. Filter units of the first two types include a pair of spaced polarizers, whose polarization directions are usually perpendicular to each other, with an intermediate plate or layer of ferroelectric ceramic or liquid crystal material provided on its surface with transparent control electrodes. Suspended-dipole filter units, in contrast, do not require the use of polarizers, and are comprised of a layer of liquid in which are suspended submicron needle-like crystal dipoles, sandwiched between transparent plates the inner sides of which are coated with transparent control electrodes.

In principle, these electrooptical filter units are capable of very high speed operation, and are therefore well suited to high-speed printing applications, and the like, where the transmission level of the filter unit is to be changed repeatedly at short time intervals. In practice, however, I have found that various properties of these electrooptical (electrical-field operated) optical filter units present very serious problems of repeatability. In some instances, these repeatability difficulties are so considerable as to virtually preclude sufficiently precise control of the transmission levels of the filter units.

For example, in the case of filter units provided with a layer of ferroelectric ceramic material of controllable birefringence, I have found that hysteresis effects are so considerable that there is often no one-to-one correspondence between the actual transmission level of the filter unit, on the one hand, and the value of the control voltage applied to the control electrodes of the ferroelectric ceramic layer, on the other hand. Thus, if a first control voltage is applied to establish a first degree of birefringence, and if then a second control voltage is applied to establish a second degree of birefringence, the degree of birefringence achieved in the second case depends not only upon the value of the second control voltage, but also upon the value of the first control voltage, and upon whether the second control voltage was higher than the first, or vice versa. Without a one-to-one correspondence between the control voltage value and the resultant transmission level, precise control of the density of the filter unit cannot be readily achieved.

In addition to hysteresis, the electrooptical material of the filter unit may exhibit very considerable non-linearity in the relationship between the value of the applied control voltage and the resultant degree of birefringence, or more generally, between the control voltage value and the resultant transmission level of the filter unit. This can be the case irrespective of whether the filter unit also exhibits non-negligible hysteresis errors.

With a non-linear control-voltage/transmission-level relationship, it is in general necessary to expressly take the non-linearity into account when selecting the value for the control voltage. The provision of transmission-level selectors designed to exhibit corresponding non-linearity in the relationship between the selected transmission level and the value of the control voltage produced by the selector, is in itself troublesome. In addition, if the non-linearity in question varies from one filter unit to the next, then the selector must be specifically modified for the filter unit with which it is to cooperate.

SUMMARY OF THE INVENTION

It is a general object of the invention to provide an additive color system of the type in question which is capable of very-high-speed and extremely precise production of a composite beam of the selected color balance.

This object, and others which will become more understandable from the detailed description below, can be met, according to one concept of the invention, by providing an additive color system which comprises light source means providing three component light beams, combining means operative for receiving the three component light beams and combining the same to form a composite light beam, three variable-density electrooptical filter units each arranged in the path of a respective one of the three component light beams, with each filter unit being provided with control electrodes and being operative for attenuating the respective component light beam to an extent dependent upon the control voltage applied to the control electrodes, and novel means for establishing transmission values. The transmission-value-establishing means includes selecting means operative for selecting the transmission values to be established and control-voltage-generating means connected to the selecting means and operative for generating and applying to the control electrodes of the filter units control voltages dependent upon the selected transmission values and including compensating means operative for compensating for repeatability errors in the response of the filter units.

When the filter units are of such a type that the repeatability errors are hysteresis errors, then, according to an advantageous concept of the invention, the compensating means includes means for compensating for such hysteresis errors.

As one such possibility, when the selecting means selects a new filter unit transmission value, the compensating means first applies to the control electrodes of the filter unit a hysteresis-compensating voltage, preferably an oscillatory voltage of decaying amplitude, whereupon the control-voltage-generating means then applies to the filter unit control electrodes a control voltage whose value corresponds to the new transmission value selected by the selector means. In this way it is possible, when establishing each newly selected filter unit transmission level, always to proceed along one and the same branch of the transmission-level/control-voltage hysteresis curves, i.e., the so-called normal curve which passes through the origin of the transmission-level/control-voltage plane.

If the transmission-level/control-voltage curve additionally or alternatively exhibits considerable non-linearity in the range of interest, then, according to another advantageous concept of the invention, the compensating means includes light sensing means for sensing the intensity of light actually passing through the filter units and generating corresponding feedback signals, and means operative for applying across the filter unit control electrodes control voltages dependent upon the differences between the command and feedback signals.

In that event, the non-linearity in the transmission-level/control-voltage curve will be compensated for, without expressly taking into account the exact character of the non-linearities of the different filter units.

This servo-control of the filter unit transmission level can be utilized to compensate for hysteresis errors as well as non-linearity, and also temperature-dependent repeatability errors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
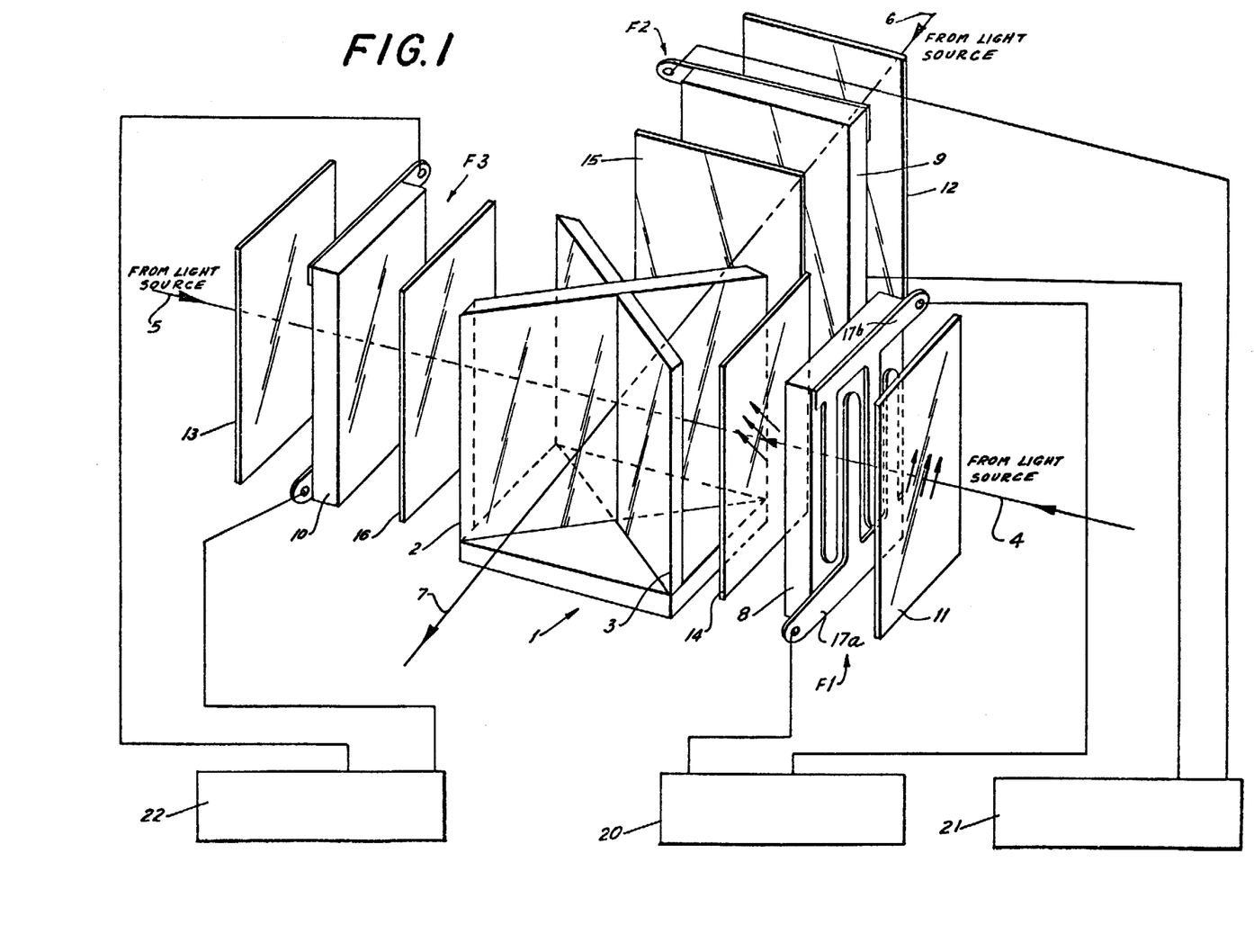
FIG. 1 depicts an optical portion of the additive color system.

FIG. 1 depicts a portion of a first embodiment of the additive color system. Numeral 1 generally denotes an optical element referred to herein as a "cross". It is comprised of two dichroic mirrors 2 and 3 which intersect each other at an angle of 90°. The dichroic mirrors 2, 3 are arranged at angles of 45° relative to incident component beams of light, here denoted 4, 5, 6. Here, the three component beams of light 4, 5, 6 are of respective ones of the three primary colors, red, green and blue, of an additive color system.

The dichroic mirror 2 reflects red light, but transmits green and blue light. The dichroic mirror 3 reflects blue light but transmits red and green light. As a result, the red, green and blue light beams 4, 5 and 6 are combined by the cross 1 to form a composite exit beam 7 of white light. Specifically, the incident red light 4 is reflected by dichroic mirror 2; the incident blu5 is reflected by dichroic mirror 3; the incident green light 6 is transmitted through both dichroic mirrors 2 and 3. Composite exit beam 7 may, for example be projected into a color printer, or be otherwise utilized.

Arranged in the path of each of the component beams 4, 5, 6 is a respective variable-density electro-optical filter unit F1, F2, F3. Each filter unit is comprised of a ceramic plate 8, 9 or 10, sandwiched between a first polarizer 11, 12 or 13 and a second polarizer 14, 15 or 16. The polarization directions of the first and second polarizers 11, 14 of the first filter unit F 1 are indicated in FIG. 1. As shown, these two polarization directions are oriented at an angle of 90° to each other. The light of the incident component beam 4 is polarized by first polarizer 11, normally passes through the ceramic plate 8 without any changes in the direction of its polarization, and then is blocked by the second polarizer 14, due to the right angle between the polarization direction of the light beam 4 and that of second polarizer 14.

The polarization directions of the other first polarizers 12, 13 and of the other second polarizers 15, 16 of the second and third filter units F2, F3 correspond to those of first polarizer 11 and second polarizer 14 of the first filter unit F1.

Ceramic plate 8 of the first filter unit F1 is operative for rotating the polarization plane of the red light 4 polarized by first polarizer 11. The angle through which ceramic plate 8 rotates the polarization plane is variable and is dependent upon the magnitude of an applied control voltage. Specifically, the front side of the ceramic plate 8 is provided with two interdigitated layers 17a, 17b, of electrically conductive material. The interdigitated layers 17a, 17b constitute control electrodes. The ceramic plates 9 and 10 of the second and third filter units are provided with corresponding interdigitated electrodes 18a, 18b and 19a, 19b (not visible in the drawing).

The apparatus additionally includes first, second and third control units 20, 21 and 22. First control unit 20 has two output terminals, each connected to a respective one of the control electrodes 17a and 17b. Control unit 20 is operative for applying across control electrodes 17a, 17b a control voltage of variable magnitude. This control voltage, in turn, establishes across the surface of ceramic plate 8 and electric field of corresponding intensity. The control voltage causes the ceramic plate 8 to rotate the polarization plane of the polarized red light 4 through an angle determined by the magnitude of the control voltage.

If ceramic plate 8 rotates the polarization plane of the red light 4 through 90°, then substantially all of the polarized red light will pass through second polarizer 14 and enter the cross 1. If ceramic plate 8 effects rotation by less than 90°, a correspondingly smaller fraction of the polarized red light 4 will pass through polarizer 14 and enter the cross 1.

Figure 2:
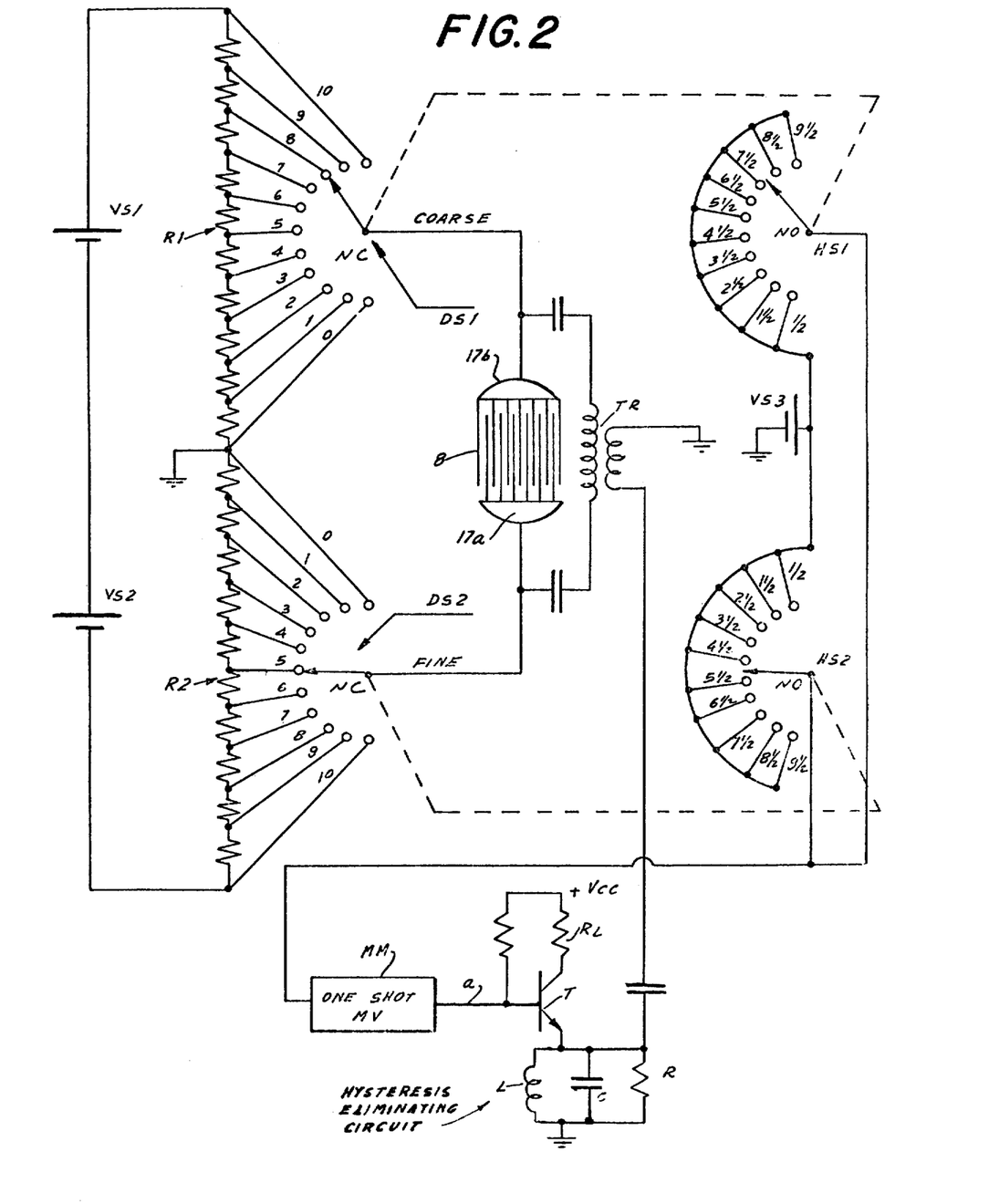
FIG. 2 depicts a first embodiment of a circuit for selecting filter unit transmission levels and compensating for filter unit repeatability errors.

The control circuit 20 of FIG. 1 is shown in detail in FIG. 2; the control circuits 21 and 22 are identical to circuit 20.

Control circuit 20 includes two decade switches DS1, DS2. DS1 is a coarse-adjustment decade switch, and DS2 is a fine-adjustment decade switch. Decade switch DS1 has eleven settings calibrated in transmission steps of 0.250 neutral density. Decade switch DS2 has eleven settings calibrated in transmission steps of 0.025 neutral density. The operator of the color correcting system sets the decade switches DS1, DS2 to settings corresponding to the desired light transmission levels for the associated filter unit F1. The stationary contacts of coarse-adjustment switch DS1 are connected to spaced junctions of a first voltage-divider resistor R1. The stationary contacts of fine-adjustment switch DS2 are connected to spaced junctions of a second voltage-divider resistor R2. The bottom terminal of voltage-divider resistor R1 and the top terminal of voltage-divider resistor R2 are connected to ground. A voltage source, here shown for simplicity as two voltage-source batteries VS1, VS2, is connected across the two voltage-divider resistors R1, R2.

When coarse-adjustment switch DS1 is moved to its "0" setting, zero potential is applied to control electrode 17b of the ceramic plate 8. As switch DS1 is successively moved to its higher settings, higher and higher positive potential is applied to control electrode 17b.

When fine-adjustment switch DS2 is moved to its "0" setting, zero potential is applied to control electrode 17a of the ceramic plate 8. As switch DS2 is successively moved to its higher settings, negative potential of successively greater magnitudes is applied to control electrode 17a.

It will be noted that, no matter what settings switches DS1 and DS2 assume (except when both are at their "0" settings), the potential applied to control electrode 17b will be positive relative to that of control electrode 17a. Specifically, the potential difference between control electrodes 17a, 17b will be equal to the sum of a potential difference component selected using coarse-adjustment switch DS1 and a potential difference component selected using fine-adjustment switch DS2.

I have found that a simple decade-switch transmission selector such as just described, as well as equivalent transmission selector arrangements, do not of themselves satisfactorily establish desired transmission values. I have found that this is due to hysteresis effects in the material of the ceramic plate 8. I have found that these hysteresis effects complicate the relationship between the magnitude of the potential difference established between the control electrodes 17a, 17b, on the one hand, and the actual angle through which the polarization plane of line 4 is rotated, on the other hand. In particular, I have found that hysteresis effects in the material of the ceramic plate 8 generally stand in the way of a one-to-one correspondence between control voltage magnitudes and actual transmission values. Therefore, in the embodiment of FIG. 2, I positively compensate for such hysteresis effects each time a transmission value is selected using the decade switches DS1, DS2.

To do this, I use an arrangement which positively returns the material of the ceramic plate 8 to its initial, unactivated condition, thereby eliminating residual birefringence. If the residual birefringence of the material of plate 8 is eliminated, it becomes possible, upon application of a control voltage across control electrodes 17a, 17b, to increase the activation of the plate 8 always along one and the same branch of the polarization curve of the material of plate 8, i.e., along the normal polarization branch, which passes through the origin of the polarization curve of the material.

The hysteresis-compensating arrangement used in the embodiment of FIG. 2 comprises a first hysteresis switch HS1 mechanically coupled to coarse-adjustment decade switch DS1, and a second hysteresis switch HS2 mechanically coupled to fine-adjustment decade switch DS2. Hysteresis switch HS1 is provided with ten stationary contacts denoted $\frac{1}{2}, 1\frac{1}{2}, \ldots, 9\frac{1}{2}$. The stationary contacts of decade switch DS1 are indicated to be NC (normally closed), whereas those of hysteresis switch HS1 are indicated to be NO (normally opened). The mechanical coupling between switches DS1 and HS1 is such that stationary contacts of HS1 are engaged by the associated switch arm only as the switch arm of DS1 is moving from one to another of its eleven settings.

Switch DS1 is shown as being in setting "8", and switch HS1 is shown as being intermediate its $7\frac{1}{2}$ setting and its $8\frac{1}{2}$ setting.

If, now, the moving contact arm of switch DS1 is moved from the "8" setting to the "9" setting, the moving contact arm of switch HS1 will move from its illustrated position to a position intermediate its $8\frac{1}{2}$ and $9\frac{1}{2}$ settings, briefly engaging its $8\frac{1}{2}$ contact in so doing.

It will be noted that all ten of the stationary contacts of hysteresis switch HS1 are connected in common to the positive terminal of a voltage source VS3.

Second hysteresis switch HS2, associated with second decade switch DS2, is identically constructed. Likewise, all its ten stationary contacts are connected in common to the positive terminal of voltage source VS3.

The moving contact arms of hysteresis switches HS1, HS2 are electrically connected in common to the input of a one-shot multivibrator MM. The output of the multivibrator MM is connected to the base of an npn transistor T. The collector of transistor T is connected to a voltage source $+V_{CC}$ via a collector resistor R1, and its base is connected thereto by a base resistor $R_B$. The emitter of transistor T is connected to the upper terminal of a parallel RLC circuit, the lower terminal of the RLC circuit is connected via a capacitor to one terminal of the primary winding of a coupling transformer TR, the other terminal of which is connected to ground. The secondary winding of the transformer TR is connected across the control electrodes 17a, 17b via two capacitors.

Figures 2A, 3:
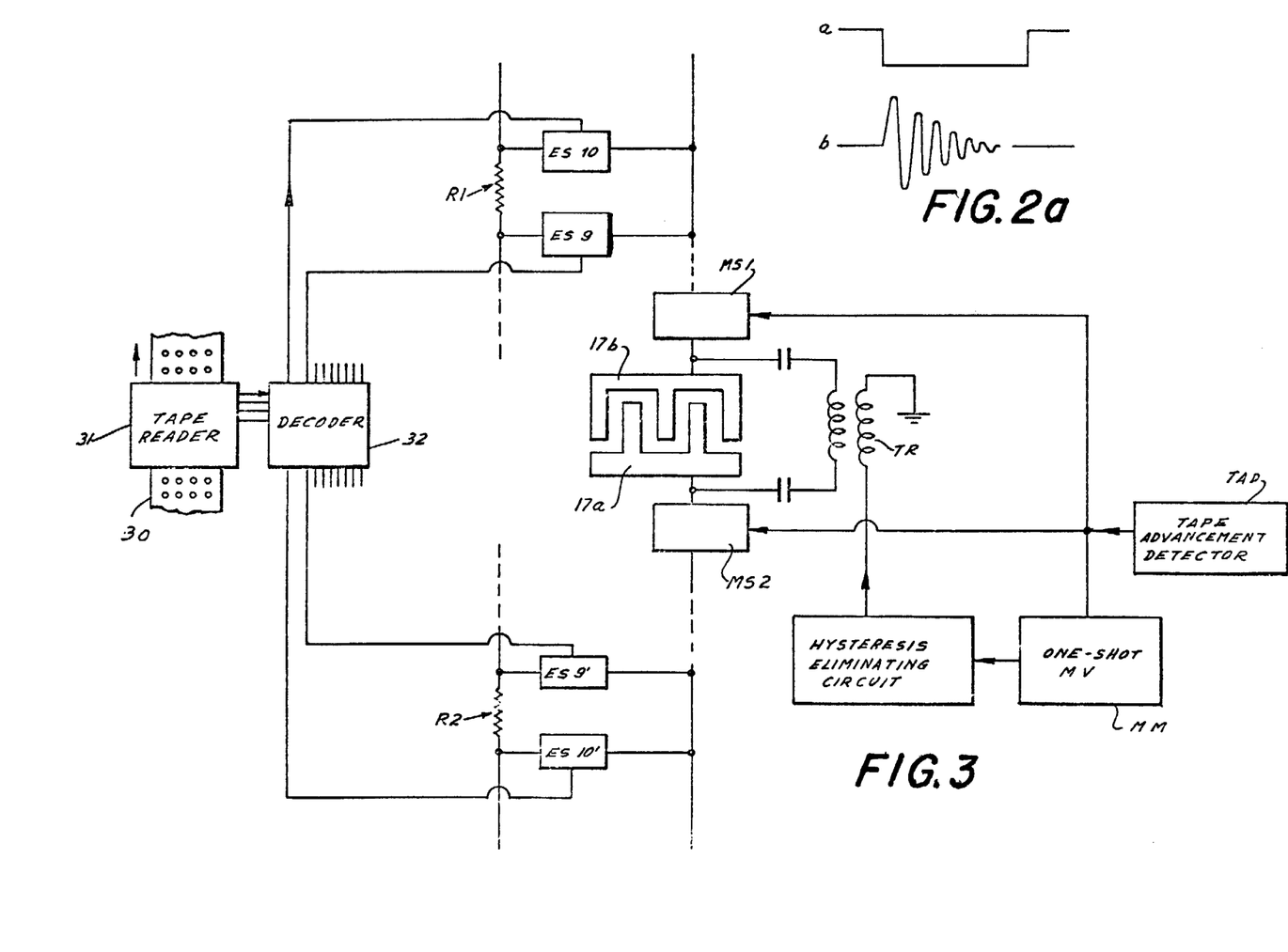
FIG. 2a depicts voltage waveforms in the circuit of FIG. 2.
FIG. 3 depicts a second embodiment of such a circuit.

Normally, transistor T is conductive and supplies energy to circuit RLC. When any of the stationary contacts of hysteresis switches HS1, HS2 is engaged by the associated moving contact arm, the positive terminal voltage of voltage source VS3 is applied to the input of the one-shot multivibrator MM, triggering the latter. When the multivibrator MM is triggered, it renders transistor T non-conductive for a short time interval. With transistor T now non-conductive, the circuit RLC acts as a source-free circuit. The energy previously introduced into circuit RLC through transistor T is transferred back and forth from inductor L and capacitor C, and at the same time is progressively dissipated within resistor R. As a result, the voltage at the upper terminal of parallel circuit RLC oscillates and decays. FIG. 2a shows the waveform at output a of the one-shot multivibrator MM, and the waveform at b, the upper terminal of the parallel circuit RLC. As can be seen, the voltage at b oscillates and gradually decays to zero.

The oscillatory and decaying voltage at line b is transmitted, via the illustrated capacitors and transformer, to the ceramic plate 8 and is applied across the control electrodes 17a, 17b thereof. This decaying oscillatory voltage causes the birefringence of the material of plate 8 to decrease to zero along successively smaller hysteresis curves, thereby progressively eliminating the residual birefringence of the material. By the time the depolarizing voltage has died down to zero, the polarization of the material of plate 8 will have reached the origin of the polarization curve, i.e., zero polarization effect for zero electric field intensity.

Thus, if either decade switch DS1, DS2 is moved from one to the next of its settings, the associated hysteresis switch HS1, HS2 will cause the residual polarization of the material of plate 8 to be eliminated before such next setting of the decade switch is actually reached. As a result, when such next setting is actually reached, the application of the new control voltage across control electrodes 17a, 17b will cause the polarization of the material of plate 8 to increase, starting from the origin of the polarization curve and always proceeding along the normal polarization curve.

In this way, I am able to establish a one-to-one correspondence between the settings of decade switches DS1, DS2, on the one hand, and the numerical value of the polarization effect of plate 8, on the other hand.

If the normal polarization curve, over the range of interest, is not sufficiently linear, this can be compensated for by appropriately selecting the resistance values of the component resistances of each of the two voltage-divider resistors R1, R2.

Accordingly, I am able to achieve precise control of the transmission level of the filter unit F1 using a very simple selector arrangement comprised of decade selector switches.

FIG. 3 depicts an electronic version of the electromechanical selecting arrangement of FIG. 2. The arrangement of FIG. 3 is suited for high-speed transmission level selection and color balance establishment, for example when a strip of negatives is being printed in a high-speed automatic printing apparatus. Components in FIG. 3 corresponding exactly to those of FIG. 2 are denoted by the same reference characters, and the part of the arrangement of FIG. 3 identical to that in FIG. 2 is not shown in FIG. 3.

In FIG. 3, the decade switches DS1, DS2 are replaced by coded tape (here a perforated tape) 30, a tape reader 31, a decoder 32, eleven electronic switches ES0-ES10 associated with the voltage-divider resistor R1, and eleven electronic switches ES0'-ES10' associated with the voltage-divider resistor R2. The electronic switches ES0-ES10 and ES0'-ES10' correspond to the eleven positions which the moving contact arms of decade switches DS1, DS2 can assume in FIG. 2. The voltage-divider resistors R1, R2 are connected across a voltage source, as in FIG. 2.

The tape 30 is provided with information representative of the color balance to be achieved, for example, for printing a succession of color negatives. As each negative to be printed enters the (non-illustrated) printing station, the tape 30 is advanced one step.

The tape reader 31 converts the coded information on the tape 30 into electrical signals, which are applied to the decoder 32. Decoder 32 has a first set of eleven outputs each connected to and controlling the conductivity of a respective one of the electronic switches ES0-ES10, and a second set of eleven outputs each connected to and controlling the conductivity of a respective one of the electronic switches ES0'-ES10'. Depending upon the information stored on the tape 30 for one advancement-step thereof, the decocer 32 renders conductive one of the electronic switches ES0--ES10 and one of the electronic switches ES0'-ES10', in correspondence to the settings of the decade switches DS1, DS2 of FIG. 2.

The right terminals of switches ES0-ES10 are connected in common to the control electrode 17b, via a normally conductive monostable switch MS1. The right terminals of switches ES0'-ES10' are connected in common to the control electrode 17a, via a normally conductive monostable switch MS2.

In FIG. 3, the one-shot multivibrator MM and the hysteresis eliminating circuit are the same as in FIG. 2. However, in FIG. 3 a tape advancement detector TAD (shown at the right of the Figure) is operative for producing an output pulse in response to each stepwise advancement of the tape 30. This output pulse is applied to one-shot multivibrator MM, to eliminate residual polarization attributable to hysteresis, as in FIG. 2. Additionally, the output pulse from tape advancement detector TAD is applied to the two monostable switches MS1, MS2, rendering them briefly non-conductive for a time interval ensuring that the control voltage selected via switches ES will not be applied across control electrodes 17a, 17b until after the elapse of a time sufficient for the elimination of residual polarization.

Figure 4:
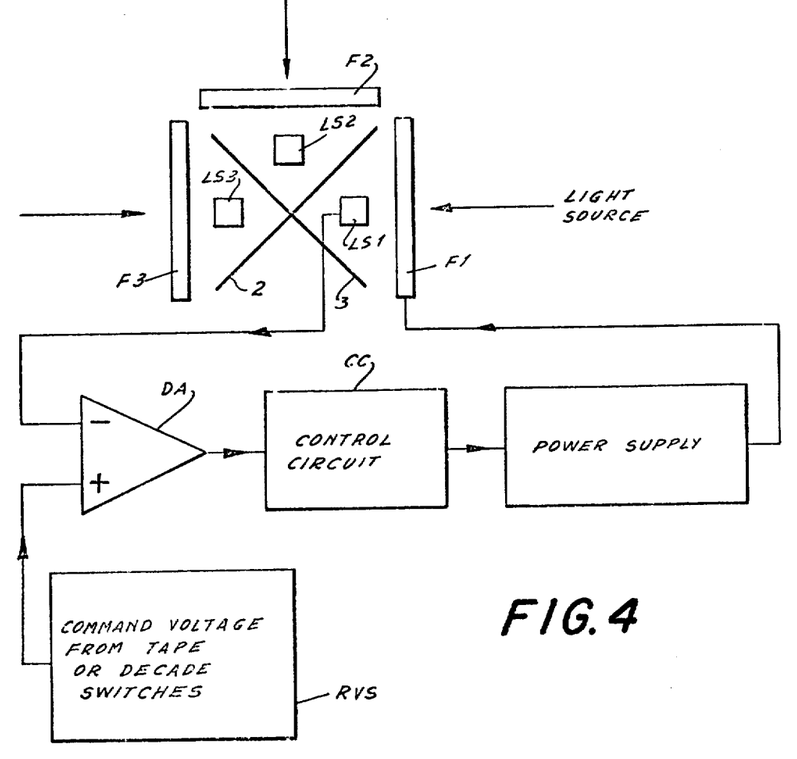
FIG. 4 depicts a third embodiment of such a circuit, designed to operate upon an negative-feedback basis.

FIG. 4 depicts another embodiment of the invention, in which the hysteresis of the material of the filter units is compensated for, without positively eliminating hysteresis effects prior to each transmission value establishment.

In FIG. 4, an arrangement like that shown in FIG. 1 is depicted as viewed from above. The cross is as before comprised of the intersecting dichroic mirrors 2 and 3. The three filter units F1, F2 and F3 may be of the same construction as those of FIG. 1, or of other constructions described further below.

The arrangement of FIG. 4 includes three light sensors LS1, LS2, LS3 located behind respective ones of the filter units F1, F2, F3 and positioned to detect the intensity of the light passing through the filter units.

Light sensor LS1 supplies light-intensity information to a servo circuit comprised of a reference voltage source RVS, a differential amplifier DA, a control circuit CC, and a power source PS.

The reference voltage source RVS supplies a command voltage indicative of the transmission value to which the associated filter unit F1 is to be set. This voltage can be selected manually (for example using a decade switch arrangement such as shown in FIG. 2) or automatically (for example using a tape reader device such as shown in FIG. 3). The voltage source RVS applies the selected command voltage to one input of the differential amplifier DA. The other input of amplifier DA receives from light sensor LS a feedback signal indicative of the actual intensity of light being transmitted by the filter unit F1. The error signal at the output of differential amplifier DA is applied to the input of the control circuit CC. The control circuit CC is per se conventional and could be constituted by a proportional transmission path connected in parallel with an integrating transmission path, i.e., so as to produce at the output of control circuit Cc an actuating voltage equal to the sum of two components, one proportional to the error voltage appearing at the output of differential amplifier DA, the other proportional to the time integral of that error voltage.

The actuating voltage at the output of control circuit CC is applied to the input of the power supply PS. At its simplest, the power supply PS could consist of a conventional power amplifier stage capable of producing a control voltage of sufficient magnitude. The control voltage produced at the output of power supply PS is applied across the control electrodes of the filter unit F1 and determines the transmission value to which the filter unit F1 is actually set.

The arrangement of FIG. 4 operates as follows:

Let it be assumed that reference voltage source RVS supplies a zero command voltage, corresponding to a desired transmission value of zero for filter unit F1, and that the actual transmission value to which the filter unit is set is in fact zero. Accordingly, the voltages at both inputs of differential amplifier DA will be zero, and a zero error signal will be present at the differential amplifier output. For the sake of explanation, let it be assumed, also, that the actuating signal at the output of control circuit CC is zero, and also that the control voltage applied by power supply PS to the control electrodes of filter unit F1 is zero.

If, now, a non-zero command voltage is selected, the voltages at the inputs of differential amplifier DA will no longer be equal, and amplifier DA will produce at its output a non-zero error signal. This non-zero error signal is applied to the input of control circuit CC, which produces at its output a non-zero actuating signal. The non-zero actuating signal is applied to power supply PS and causes the latter to apply to the control electrodes of filter unit F1 a non-zero control voltage. As a result, the transmission of filter unit F1 changes from zero towards the newly selected value.

As indicated above, the actuating signal at the output of control circuit CC is equal to the sum of two components, one proportional to the error signal from amplifier DA, the other proportional to the time-integral of that error signal. Accordingly, at the moment that the command voltage from RVS changes from zero to a non-zero value, the actuating signal at the output of CC will consist entirely of the component proportional to the error signal; the component proportional to the time-integral of the error signal will not yet have assumed a non-zero value.

However, as the transmission level of filter unit F1 changes towards the newly selected value, the component of the actuating voltage at the output of CC proportional to the time-integral of the error voltage will rise, due to the integration with respect to time. Meanwhile, however, the component of the actuating voltage proportional to the error signal will be decreasing, because of the decreasing discrepancy between the actual transmission value of filter unit F1 and the newly selected transmission value.

Once the transmission of filter unit F1 reaches the newly selected transmission value, the feedback voltage applied by light sensor LS1 to differential amplifier DA will equal the new command voltage applied to differential amplifier DA. Accordingly, when the newly selected transmission value is actually reached, the error signal at the output of amplifier DA will again be zero.

In contrast, the actuating signal at the output of control circuit CC will not be zero when the newly selected transmission value has actually been reached; instead, the actuating signal will have a magnitude just sufficient to cause power supply PS to produce a control voltage which will maintain the transmission of filter unit F1 at the newly selected level. This can be explained as follows. The component of the actuating signal which is proportional to the error signal has now died down to zero, because the error signal has died down to zero. However, the component of the actuating signal which is proportional to the time-integral of the error signal has meanwhile built up from zero to a value just sufficient to maintain the filter unit control voltage at the requisite value.

In general, at the end of each such transmission-level selection the actuating signal at the output of control circuit CC will consist entirely of the time-integral component thereof, which will have just the value needed to maintain the new steady-state transmission value, with the proportional component of the actuating signal being zero.

With the arrangement of FIG. 4, hysteresis effects are compensated for, without actually eliminating residual birefringence at the start of each transmission value selection.

Also, the arrangement of FIG. 4 inherently compensates for non-linearity in the relationship between the magnitude of the control voltage and the actual transmission value of the filter unit. In the embodiment of FIG. 2, for example, such non-linearity had to be positively taken into account, by compensatory dimensioning of the component resistances of the voltage-divider resistors R1 and R2. In the embodiment of FIG. 4, this need not be done. Moreover, differences in the non-linear relationships of one filter unit and a replacement filter unit, for example, are automatically compensated for, and need not be taken into account separately. Likewise, repeatability errors attributable to temperature dependence and other such factors are also compensated for, without having to be taken into account separately.

In the arrangement of FIG. 1, the three filter units are each comprised of a plate 8 of ferroelectric ceramic material provided with two transparent electrically conductive layers configurated to form interdigitated control electrodes on the surface of the plate 8, and the plate 8 is sandwiched between polarizers whose polarization directions are perpendicular. This type of filter unit is described in detail in U.S. Pat. Nos. 3,512,864 and 3,737,211. As indicated above, the ferroelectric ceramic material used often exhibits non-negligible hysteresis effects.

Figure 5:
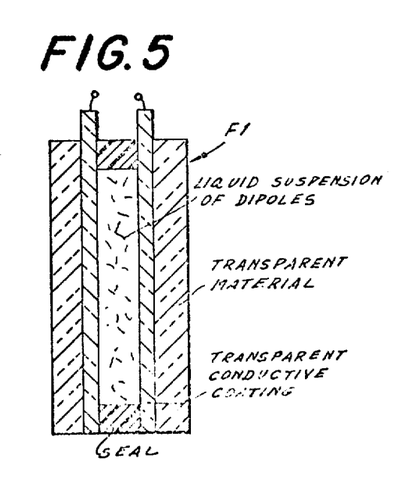
FIGS. 5 and 6 depict alternative filter unit constructions.

Another construction which can be used for the filter units of the embodiment illustrated above is depicted in FIG. 5. This filter construction is comprised of two outer layers of glass (or other transparent material such as plexiglass, etc.) each of which contains a transparent electrically conductive coating on its inner surface, between which is sealed-in a liquid layer containing dipoles in suspension. This liquid is known as "VARAD" and the filter construction itself is manufactured by the Marks Polarized Corporation of New York, New York. It is more fully described in "Applied Optics", Vol. 8, page 1397, July 1969. One difference between such a "VARAD" filter and the ferroelectric ceramic filter described earlier, is that the former requires an A.C. control voltage instead of a D.C. voltage. However, it will be clear that, if a "VARAD" filter is used in the above embodiments, it is a simple matter to replace the illustrated D.C. voltage sources with A.C. voltage sources.

Figure 6:
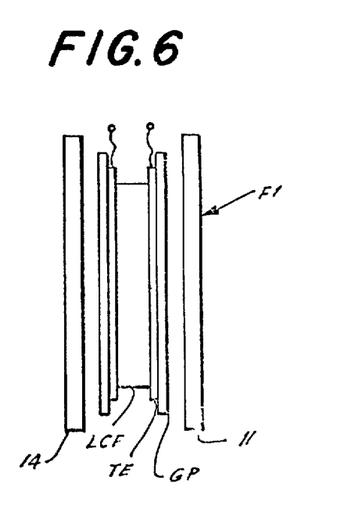

FIG. 6 depicts an alternative construction for the filter units. The filter unit of FIG. 6 comprises, as before, the two crossed polarizers 11, 14. However, here there is located between the polarizers a film of liquid crystal LCF, sandwiched between two glass plates GP each of which is provided on its inner face with a transparent electrode TE. Liquid crystal filter units are by now quite well known, and described, for example, in "Journal of Applied Physics," Vol. 43, No. 5, pp. 2029-2037.

With respect to the different constructions of the filter units F1, F2, F3 (ferroelectric ceramic, liquid suspension of dipole particles, liquid crystal, etc.), the transmission selecting arrangements of FIGS. 2 and 3 are most appropriately used where hysteresis effects are encountered, whereas the arrangement of FIG. 4 is appropriately used irrespective of whether hysteresis effects are present.

It will be understood that each of the elements described above, or two or more together, may also find a useful application in other types of circuits and constructions differing from the types described above.

While the invention has been illustrated and described as embodied in an additive color system adapted to provide white light of corrected color balance to an automatic printer, or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an additive color system, in combination, light source means providing a plurality of component light beams; combining means operative for receiving the plurality of component light beams and combining the same to form a composite light beam; light-attenuating filter means arranged in the paths of respective ones of said light beams operative for controlling the color balance and intensity of the composite beam, and including electrooptical filter means provided with control electrodes and being operative for attenuating the respective light beam to an extent dependent upon the control voltage applied across the control electrodes, transmission-value-establishing means operative for setting the electrooptical filter means to different transmission levels, including selecting means operative for selecting the transmission values to be established, control-voltage-generating means connected to the selecting means and operative for generating and applying to the control electrodes control voltages dependent upon the selected transmission values and including compensating means operative for compensating for repeatability errors in the response of the electrooptical filter means.

2. A system furnishing a controlled beam of light comprising, in combination, light source means providing a light beam; a variable-density electrooptical filter unit arranged in the path of said light beam, the filter unit being provided with control electrodes and being operative for attenuating said light beam to an extent dependent upon the control voltage applied across the control electrodes; transmission-value-establishing means operative for setting the filter unit to different transmission levels, comprising selecting means operative for selecting the transmission value to be established, control-voltage-generating means connected to the selecting means and operative for generating and applying to the control electrodes of the filter unit a control voltage dependent upon the selected transmission value and including compensating means operative for compensating for repeatability errors in the response of the filter unit, the relationship between the control voltage applied to the control electrodes of the filter unit and the actually resultant transmission value exhibiting hysteresis, the repeatability errors accordingly comprising hysteresis errors, the compensating means comprising means for compensating for hysteresis errors in the response of the filter unit.

3. The system defined in claim 2, the filter unit comprising a pair of spaced polarizers and intermediate the same a ferroelectric ceramic plate of controllable optical birefringence, the control electrodes of the filter unit being provided on the surface of the ferroelectric ceramic plate, the relationship between the birefringence of the material of the plate and the control voltage applied to the control electrodes on the plate exhibiting said hysteresis.

4. The system defined in claim 2, wherein the compensating means comprises means automatically operative each time the selecting means selects a new filter unit transmission value for first applying across the control electrodes of the filter unit a hysteresis-compensating voltage and then a control voltage corresponding to the newly selected transmission value.

5. The system defined in claim 2, the hysteresis-compensating voltage being an oscillatory voltage of decaying amplitude.

* * * * *